April 4, 1939.  R. R. BROGDEN  2,153,295
MACHINE FOR BRUSHING AND OTHERWISE TREATING FRUIT AND OTHER ARTICLES
Filed March 21, 1936  6 Sheets-Sheet 2

INVENTOR
RONALD R. BROGDEN.
BY
ATTORNEY

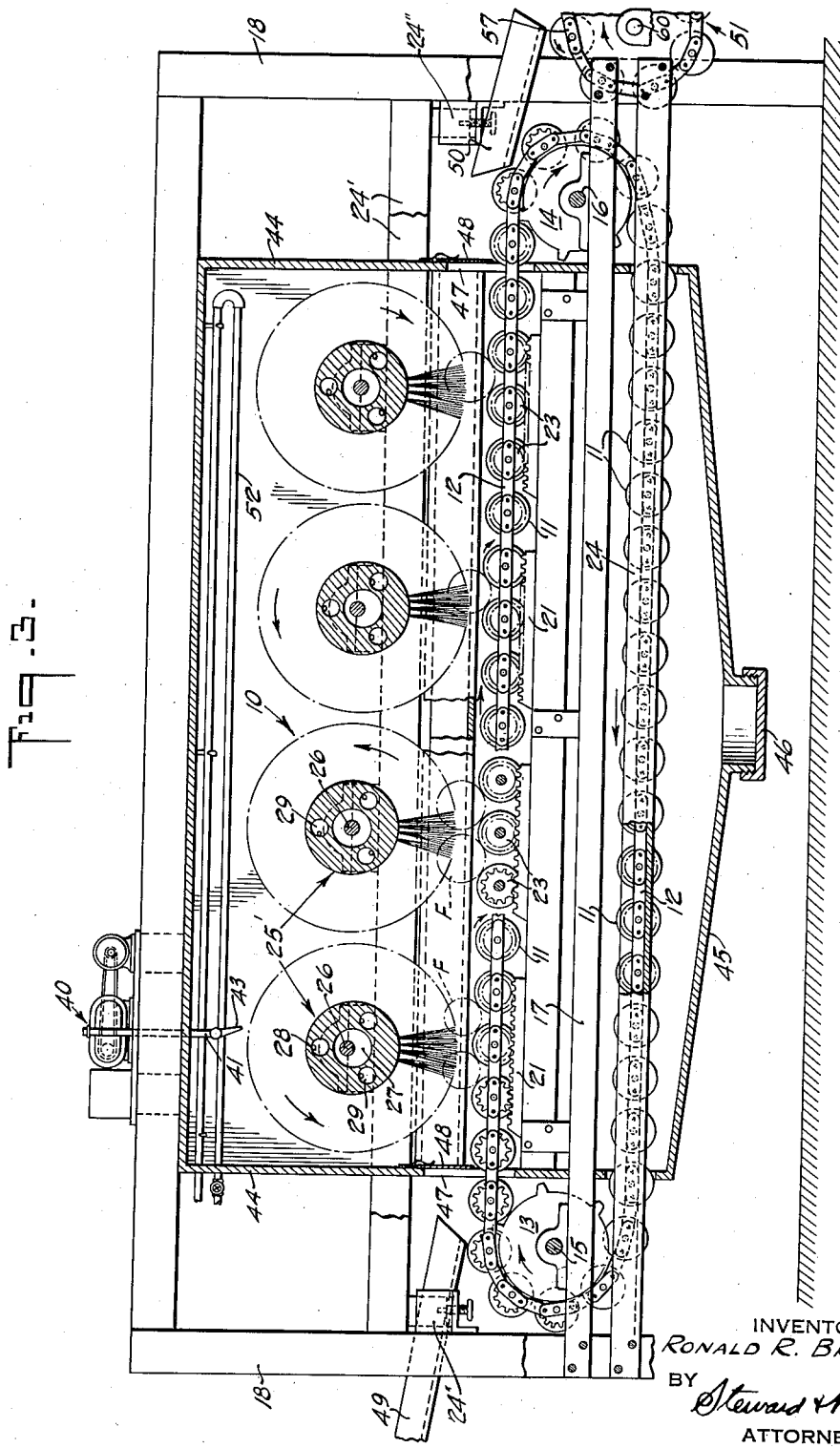

April 4, 1939.      R. R. BROGDEN      2,153,295
MACHINE FOR BRUSHING AND OTHERWISE TREATING FRUIT AND OTHER ARTICLES
Filed March 21, 1936      6 Sheets-Sheet 4
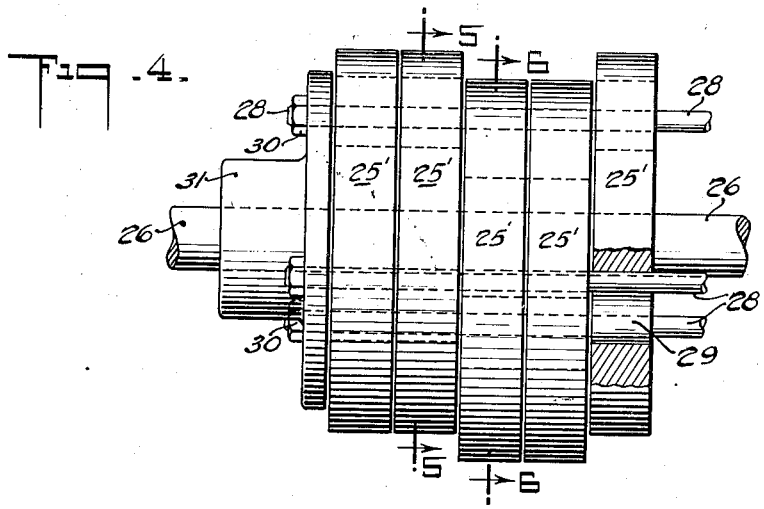
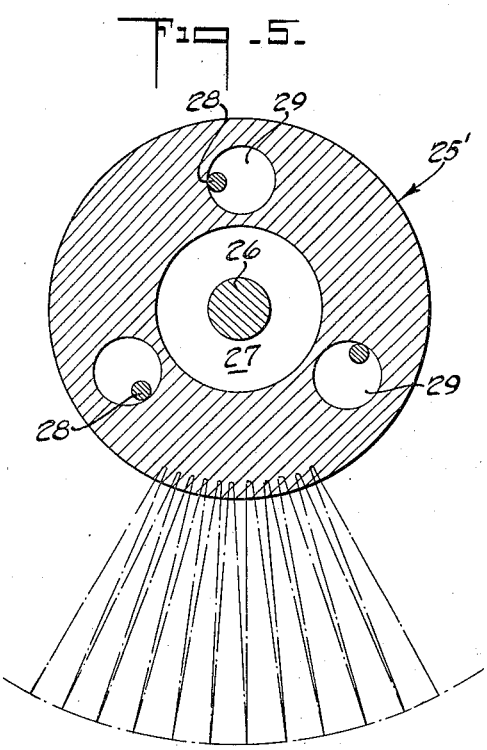
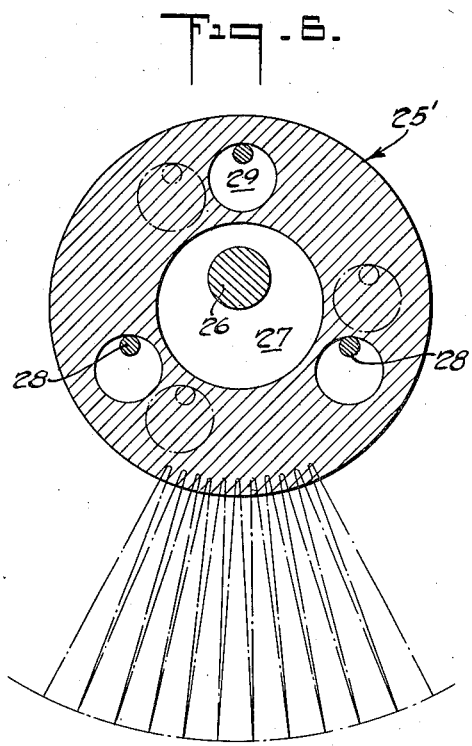
INVENTOR
RONALD R. BROGDEN.
BY
Steward & McKay
ATTORNEY April 4, 1939. R. R. BROGDEN 2,153,295
MACHINE FOR BRUSHING AND OTHERWISE TREATING FRUIT AND OTHER ARTICLES
Filed March 21, 1936 6 Sheets-Sheet 5

INVENTOR
RONALD R. BROGDEN
BY
Steward & McKay
ATTORNEY

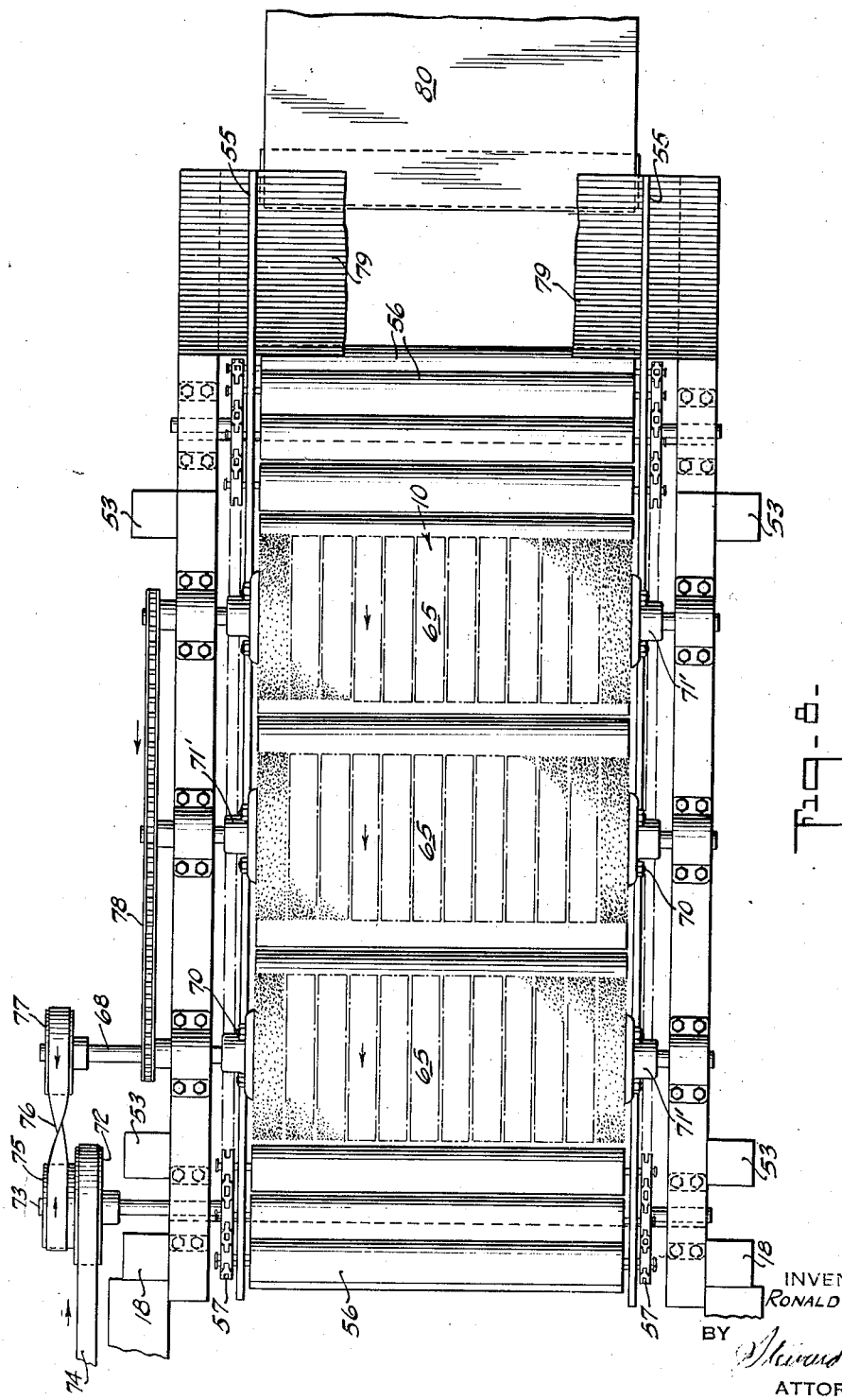

Patented Apr. 4, 1939

2,153,295

UNITED STATES PATENT OFFICE 2,153,295

MACHINE FOR BRUSHING AND OTHERWISE TREATING FRUIT AND OTHER ARTICLES

Ronald R. Brogden, Orlando, Fla., assignor to Brogdex Company, Winter Haven, Fla., a corporation of Florida Application March 21, 1936, Serial No. 70,128

22 Claims. (Cl. 91—39)

This invention relates to a machine for brushing and otherwise treating fruit and other articles; and it relates more particularly to a machine for effecting such treatments of fresh fruits and vegetables as involve a rubbing or brushing of the articles for cleaning or otherwise preparing them for market.

While the machine of the invention is useful for the brushing for various purposes of numerous articles of widely differing nature and body shape, it is more particularly designed and is especially adapted for use in connection with such treatments of fresh fruits and vegetables as are mentioned above. Among fresh fruits which may advantageously be treated by the machine of my invention may be mentioned oranges, grapefruit, lemons, avocadoes, apples, peaches, pears; and, among vegetables, potatoes and tomatoes and like vegetable products. All such fruit and vegetable products are of more or less globular shape, but the machine is also adapted to handle fruits and vegetables as well as other articles not only of generally globular shape but also of generally cylindrical shape and even certain articles of generally rectangular shape. The term "fruit", as hereinafter used in this specification and in the appended claims is to be understood as including such vegetables products as are mentioned above as well as fruit proper.

Where articles are of the character requiring a rubbing or brushing of their surfaces in finishing or otherwise preparing them for market, in most instances it is advantageous to have the rubbing or brushing of uniform intensity regardless of variations in size of the individual units of the lot of articles of any one kind being treated; and this is especially so in the treatment of fresh fruit. Also, in the treatment of fresh fruit in particular, the brush pressure and friction must be relatively light to avoid injury to the fruit and especially to the more tender and thinner skinned varieties.

A general object of my invention is to provide a machine which will meet the foregoing requirements in the brushing of various articles and especially in the brushing of fresh fruit. As the machine, although of the indicated wider usefulness, is especially designed for the treatment of fresh fruit, reference will be made primarily thereto in further explaining the objects and principles of the invention.

The practical importance of the foregoing general object of the invention and the problem involved in its attainment, especially in a fruit-brushing machine, will appear from the following brief consideration of typical brushing machines used heretofore in that practical art.

A common type of such machines has been one having brush rolls presenting revolving brush surfaces so formed as to support and advance the fruit through the machine while brushing it. Machines of that type have generally been satisfactory for the brushing of such fruits only as have substantial firmness of body and a relatively thick or tough rind or skin, such fruits, for example, as oranges, grapefruit and potatoes. As relatively short and correspondingly stiff bristles are necessarily employed in the brush rolls of such machines to enable them to properly support as well as effectively brush articles of fruit and the latter are supported practically on the ends of those bristles, there is considerable bouncing of the fruit on the brushes which tends to cause injury to the more tender and thinner skinned varieties, such, for example, as lemons, peaches, pears, avocadoes and tomatoes, one frequent injury in such machines being a puncturing of the skin of such fruit by the brush bristles as the fruit bounces about thereon.

Numerous attempts have heretofore been made to solve the foregoing problem and provide a fruit-brushing machine capable of efficiently and safely handling the more tender and thinner skinned varieties as well as those of firmer body and thicker skin or rind. Some of those attempts have taken the form of brushes, in some instances of the rotating brush roll type but usually of the non-rotatable type such as block brushes, disposed in fixed position or spring-mounted for upward yield over the lower or main brush rolls so as to supplement the brushing action of those rolls and prevent or greatly reduce the upward bouncing of the fruit thereon. In other instances, the lower brush rolls have been dispensed with altogether, a brushless fruit conveyor substituted therefor, and overhead brushes of the types just referred to employed to brush the fruit as it is advanced by the conveyor. While those changes have been substantial improvements, they have not proven entirely satisfactory as a solution of the problem as such machines have generally been effective only for a rather limited range of sizes of fruit of any particular kind which they were designed to handle. This appears to be due in substantial part at least to the fact that the overhead brushes heretofore employed in such fruit-treating machines have been of a construction and operating arrangement in relation to the lower brush rolls or brushless fruit conveyor so substantially increasing the brush pressure on individual fruit of the larger sizes occurring in the lot undergoing treatment as to undesirably increase the intensity of the brushing action thereon and tend to injure such individual fruit especially when of the more tender and thinner skinned variety.

Accordingly, more particular objects of my invention are to provide a fruit-treating machine having conveyor and brush means overcoming the last mentioned defects of prior machines of this general character and especially such conveyor and brush means as will properly feed fruit through the zone of the brushing action without bouncing of the articles on the brushes or other fruit-engaging surfaces, and not only will effectively brush each individual fruit with uniform brush pressure and friction regardless of variations in size, but will also apply the brush with such lightness and delicacy of stroke as to avoid injury to even the more tender and thinner skinned fruits.

Generally stated, the machine of my invention comprises a conveyor preferably having a brushless article-supporting surface and mechanically operating to support and advance the articles in a predetermined path through the zone of the brushing action, and one or more overhead rotary brushes with each such brush so mounted as a floating brush on its driving shaft as to be movable upward radially of that shaft from a limiting low position of the brush, substantially against its own weight alone, by pressure against its lower side of fruit or other articles of varying vertical dimensions on the conveyor.

With such an arrangement, the brush pressure on fruit, for example, is substantially uniform regardless, within practically satisfactory limits, of individual variations in fruit sizes, for the range of vertical movement of the overhead brush radially of its driving shaft can be made to correspond substantially with the range of variations in sizes of fruit of any particular kind the machine is designed to handle and within that range of movement of the brush its pressure on the fruit is determined substantially by the weight of the brush alone. Also, that brush can be made light enough to give, at the high peripheral speed permissible with such an overhead brush, a stroke upon the fruit effectively brushing the same and yet of such lightness and delicacy as to avoid injury to even the most tender and thin skinned varieties.

Still further, in the best practice of the invention, the foregoing advantageous operating characteristics of the overhead brushes are enhanced by forming each brush as a whole or unit of a plurality of relatively short annular sections or rolls disposed in succession axially or lengthwise thereof and along the common driving shaft and with each section roll mounted on that shaft as a floating roll for upward yielding movement independently of the others after the manner of the upward yielding movement of the brush as first described above.

The machine of the invention may take various forms useful simply for brushing fruit or other articles or for various treatments of the articles involving a brushing of the same only as one of the incidents of the treatment. With reference to the treatment of fruit, for example, the invention may take the form of a fruit washer designed to scrub the fruit with an aqueous or other cleaning fluid, a fruit drier designed to wipe or brush wet fruit for removing the moisture therefrom and drying the same, a machine for applying waxy material to fruit and rubbing the same thereover into a film coating, or a fruit polisher.

The objects, principles and advantages of the invention will more fully appear from the concrete embodiment thereof in two machine units hereinafter described and shown in the accompanying drawings, which are designed more particularly for use in series in treating fresh fruit, one for brushing such fruit with fluent treating material to prepare it for an additional or final brushing in conditioning the fruit for market, and the other to give the fruit that additional or final brushing. These machine units may be utilized, however, either separately or in series, for other fruit treatments involving a brushing of the fruit or for the brushing of other articles for various purposes.

As the invention is of the indicated broad scope, these embodiments of it are to be taken not as restrictive but merely as examples of its practice more particularly in the practical art of treating fruit to which the invention more especially but not solely relates.

Referring to the accompanying drawings forming a part of this specification;

Fig. 4 is a partial side-elevational view, on a larger scale than the preceding views, of one of the overhead sectional brushes employed in that machine unit, but with the brush bristles omitted so as to show the solid body portions or cores of the section rolls;

Fig. 5 is a transverse vertical sectional view, on the line 5—5 of Fig. 4, through one of the section rolls of the brush;

Fig. 6 is a similar sectional view of one of the section rolls of the brush on the line 6—6 of Fig. 4 but showing the roll in a vertical position with respect to its driving shaft differing from the position of the roll shown in Fig. 5;

Fig. 8 is a top plan view thereof; and

Fig. 9 is a detailed plan view of a part of the conveyor mechanism employed in the first machine unit.

Figure 1:
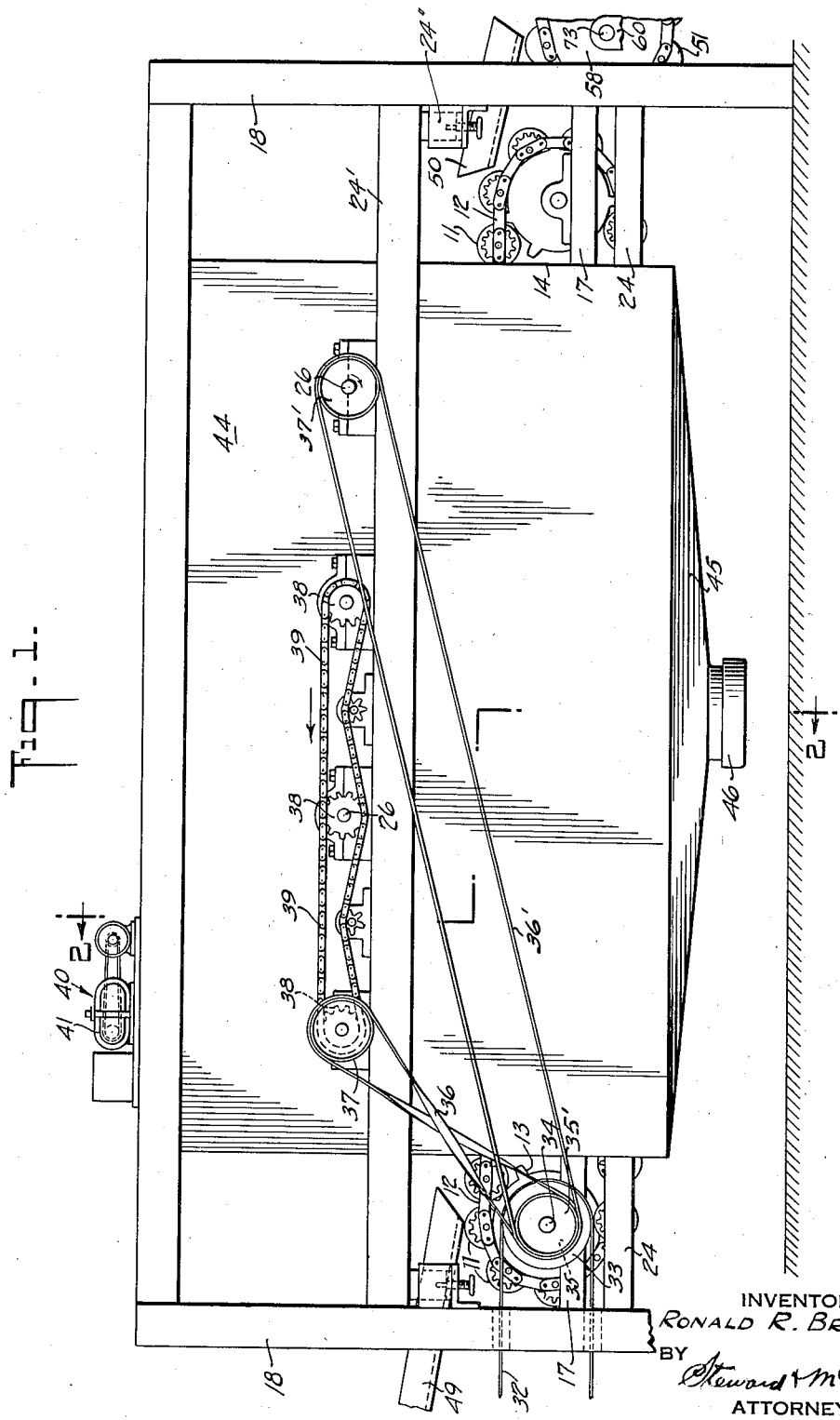
Fig. 1 is a side-elevational view of the first unit of the above-mentioned machine.
Figure 2:
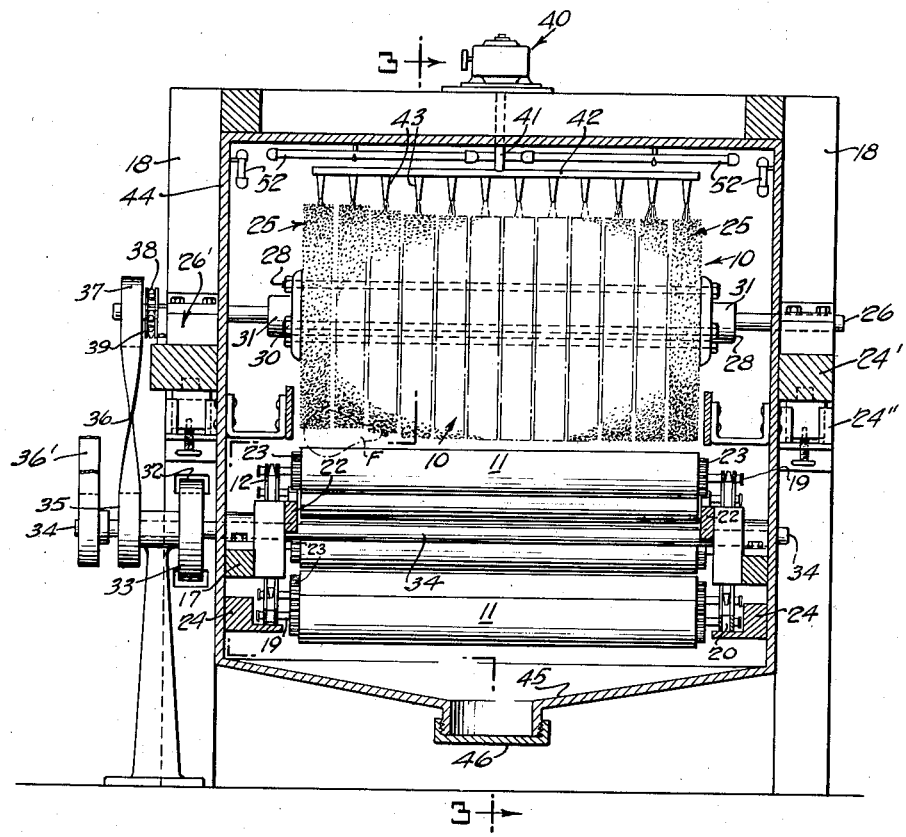
Fig. 2 is a transverse vertical sectional view of that machine unit approximately on the line 2—2 of Fig. 1, with certain interior parts of the machine, including the overhead brush rolls, shown in elevation.
Figure 3:
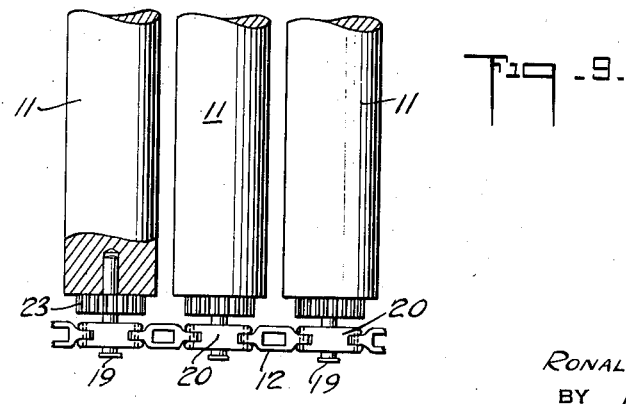
Fig. 3 is a longitudinal vertical sectional view of that machine unit approximately on the line 3—3 of Fig. 2.
Figure 7:
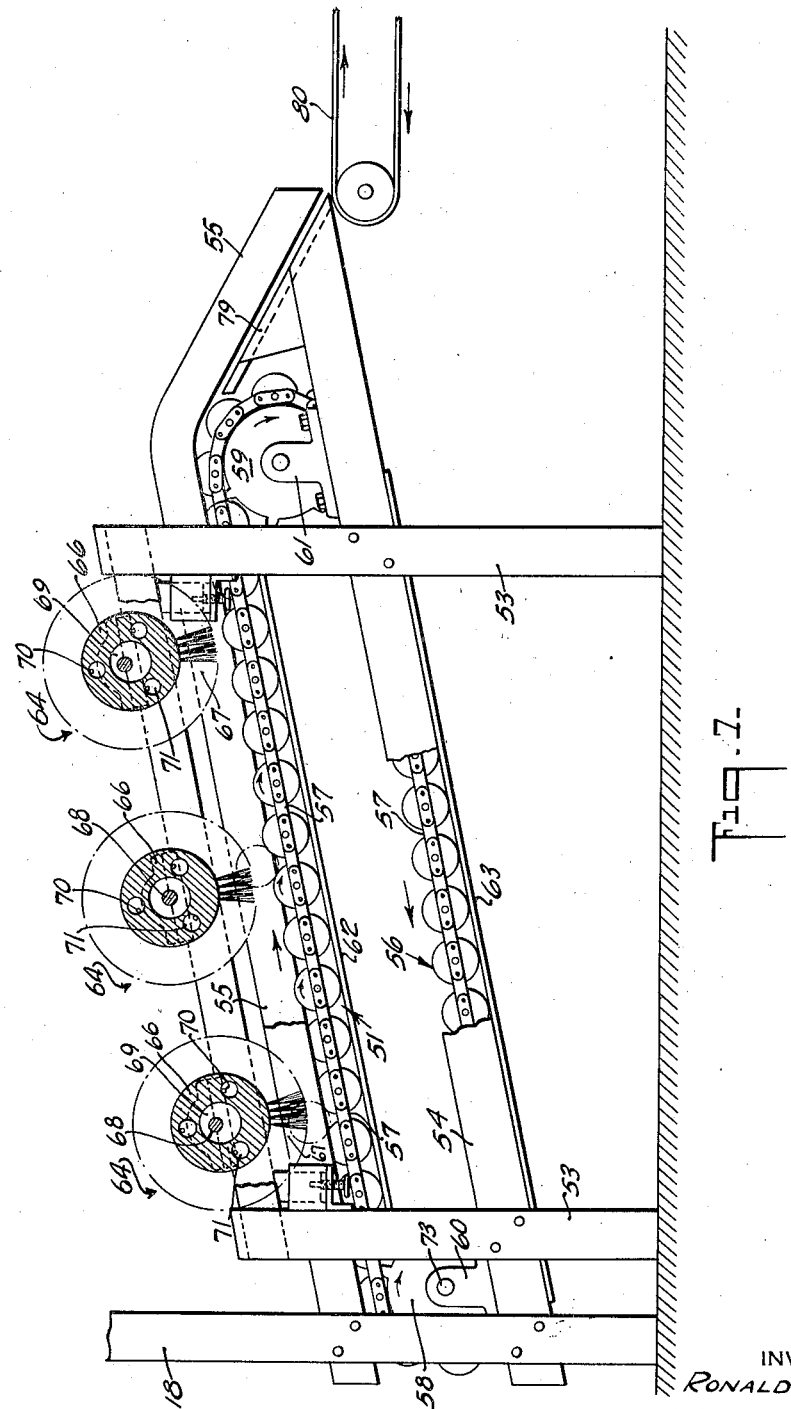
Fig. 7 is a view, partly in side elevation and partly in section, of the second unit of the machine.

The machine illustrated may be generally described as comprising principally two rubbing or brushing units, one shown in Figs. 1 to 3 inclusive, and the other in Figs. 7 and 8, operatively associated in series to carry out brushing operations in successive stages. In the present example, the first-mentioned unit is designed for use more particularly in brushing fresh fruit with fluent treating material to prepare it for an additional or final brushing in conditioning the fruit for market, and the second to give the fruit that additional or final brushing.

Referring now more particularly to the machine unit shown in Figs. 1 to 3 inclusive, a plurality of overhead rotary brushes or brush units of the sectional construction hereinbefore mentioned are employed, as indicated at 10. The details of their construction and functioning will later be more fully pointed out, but it is now sufficient to note that these brush units are disposed in a series extending longitudinally of the path of travel of the fruit, the machine here shown having four of these brush units in the series, and that each brush unit is disposed in horizontal position transversely of the path of travel of the fruit. Any conveyor means suitable for supporting and conveying fruit beneath the brushes in a fixed path transverse to the rotational axes of the latter and preferably having associated means for imparting rotary movements to each article of fruit on the conveyor as it is transported through the zones of the brushing action, may be employed. In the present example, a conveyor of the endless roller belt type having an upper horizontal run is employed. That conveyor comprises an endles series of rolls 11, brushless in this instance, mounted at their opposite ends in the pair of endless side chains 12 in a manner disposing the rolls transversely of their line of travel, parallel to the rotational axes of the overhead brushes and to one another and slightly spaced apart. Those chains are trained over two pairs of sprockets 13 and 14 adjacent opposite ends of the machine unit, and the sprockets have their shafts journaled in bearings 15 and 16 suported on the side rails 17 of the framework of the machine, the supporting uprights of that framework being indicated at 18. As shown more in detail in Fig. 9, each roll of the conveyor is provided at its opposite ends with pins 19 journaled in bearing blocks 20 of the side chains 12.

Usually, in conveyors of the foregoing general type the rolls are individually and constantly rotated on their axes throughout at least the upper run of the conveyor and generally by engagement of the rolls upon a track disposed beneath that run, and such means may be resorted to in the precent machine unit. Preferably, however, means are provided to rotate the conveyor rolls individually only through those portions of the upper run of the conveyor which are beneath the overhead brushes so as to maintain the conveyor rolls, and consequently the fruit upon the conveyor, without rotative movement as it traverses the spaces between the successive zones of the brushing action provided by the series of overhead brush units. In the machine unit shown in Figs. 1 to 3 inclusive, that means comprises two opposite-side series of racks 21, with four racks in each series to correspond with the four overhead brush units, with the racks of the respective series mounted on opposite-side rails 22 of the framework of the machine and with the racks in the respective series in end-spaced relation to present a pair of oppositely disposed racks directly beneath each overhead brush unit. The conveyor rolls are provided, at their opposite ends, with pinions 23 which engage the racks and thereby set those rolls in rotation on their own axes as they are carried bodily along in engagement with the racks in the upper run of the conveyor. Due to the end spacing of the racks, however, the conveyor rolls remain without rotation throughout their travel from the zone of the brushing action of each overhead brush unit to that of the next of the series of such units. The series of racks 21 not only cause rotation of the conveyor rolls in the region of the brushing zones provided by the series of ovehead brush units but also serve to support the upper run of the conveyor at points between the sprockets which drive the conveyor chains. The lower run of the conveyor may be supported at points intermediate the sprockets by any suitable means, such, for example, as horizontal flanges provided on side angle bars 24 to be slidingly engaged by the bearing blocks 20 of the conveyor chain, as shown in Fig. 2.

Each overhead brush as a whole or unit comprises a plurality of separate brush sections, 25, twelve in number in the present example, with each such section formed as a complete but relatively short brush roll, herein termed a section roll, and with these section rolls all of the same diameter and arranged in succession axially or lengthwise thereof and lengthwise of the driving shaft 26 of the unit. Preferably, and as shown in the drawings, these section rolls are disposed end to end along the driving shaft 26 of the brush unit; and that shaft is mounted for rotation in bearings 26' on side rails 24' of the machine to dispose that shaft in horizontal position at a predetermined level above the conveyor and transverse to the path of travel of the fruit. The machine is preferably provided with means for vertical adjustment of the bearings 26' and consequently of the level of the driving shafts 26 above the conveyor. Any suitable means may be employed for that purpose. In the illustrative machine, the side rails 24' are mounted at their opposite ends in vertically adjustable supporting devices, 24'', attached to the end uprights 18 of the machine, these devices being of well known construction comprising slide-way brackets and screw-adjustable blocks therein to which the ends of the side rails 24' are anchored. Vertical adjustment of the blocks adjusts the level of the side rails 24' and consequently of the bearings 26' which are mounted thereon.

Provision is made for coupling the section rolls of each brush unit to the driving shaft 26 of the unit in a manner mounting them as separate floating brush rolls and providing a driving connection from that shaft to the rolls for the rotation of each roll on its own axis in any vertical position it assumes. To that end the brush section rolls are each formed with a rigid cylindrical or disc core 25' of wood or other suitable lightweight material, centrally bored, as indicated at 27, on a diameter substantially greater than that of the shaft 26, for the extension of that shaft therethrough out of contact at all times with the cores of the rolls. The section rolls of each brush unit are coupled to the driving shaft 26 of the unit for the mounting and driving of the rolls by a plurality of identical coupling rods 28 of circular cross section, three in number in the present example, which extend through three eccentric bores or circular apertures 29, of diameters equal to each other and greater than those of the rods 28, in the disc core of each section roll. The eccentric bores 29 in the disc core of each section roll extend through the core in parallelism with the axis of the core, and these bores are so located as to space their longitudinal center lines equal distances from the axis of the core and equal distances apart circumferentially of the core. The coupling rods 28 are so mounted at their ends, by nut connections 30, on flanges 31 of the driving shaft 26 adjacent the opposite ends of the brush unit as to extend those rods in parallelism with the driving shaft 26 and to space their longitudinal center lines radially from the axis of that shaft and from each other circumferentially of that shaft in accordance with the above-described spacing of the eccentric bores in the disc cores of the section rolls about the axes of those cores.

With each brush unit of the series constructed and mounted as described above and as shown in the drawings, the coupling rods 28 and the eccentric bores 29 in the disc cores of the section rolls through which those rods extend contitute a rod-and-socket coupling between the driving shaft 26 of the brush section rolls mounting the latter for rotation in unison with that shaft and for movement of each section roll independently of the others from a limiting low position thereof upward radially of that shaft by upward pressure, against its lower side of advancing articles of fruit on the conveyor substantially without other opposition than that afforded by the weight of the engaged section roll. The maximum extent or range of that upward movement of the brush section rolls is determined, of course, by the diameters of the eccentric bores 29 in their disc cores relative to the diameters of the coupling rods 28 which extend through those bores. It is further to be noted that this rod-and-socket coupling between the driving shaft 26 and the section rolls of each brush unit is such as to drive each section roll on its own axis in any vertical position of that roll attained by upward pressure, against its lower side, of advancing articles of fruit on the conveyor and to restrain that roll from any substantial movement radially of that shaft due to any centrifugal force developed in driving the roll from that shaft.

The limiting low position of each section roll of each brush unit is that of the roll shown in cross-section in Fig. 6, in which low position the roll is eccentric to the driving shaft 26 of the brush unit in which the section roll is located. For the brushing pressure of the rotating roll not to exceed its normal desired value equal to the weight of the roll, the limiting high position is that represented in Fig. 5, in which limiting high position the roll substantially exactly centers itself with respect to the driving shaft 26, and each rod 28 is at the limit of its forward movement along the surface of bore 29. The use of the expressions forward movement and rearward movement in this connection refer to the direction of travel of the rod 28.

The shifting of each rod in its bore 29 from the position shown in Fig. 6 to that of Fig. 5 is due partly to the radial lifting pressure exerted by articles traveling beneath and engaged by the brush, and partly to the retarding force applied to the periphery of the roll by engagement with such articles. The retarding force, which is due partly to friction and partly to resistance of the brush bristles to bending, tends to move each bore 29 rearwardly with respect to the rod therein, and thus shifts the rod forwardly along the surface of the bore. This forward movement in the bore from the position of Fig. 6 tends to lift the roll and reduce the radial pressure on the article due to the roll weight. The relative importance of the retarding force and the radial lifting action exerted by the articles will vary under different conditions, and ordinarily the lifting force will be the principal factor.

When the roll is lifted above the position shown in Fig. 5, however, the rods 28 are forced to move rearwardly along the surfaces of the bores 29, thereby adding a downward component of force to the weight of the roll, and increasing the downward pressure on the articles to a progressively increasing extent. Since an important purpose of this invention is to minimize the downward pressure on the articles, shaft 26 should be located or adjusted, and bores 29 and rods 28 should be proportioned, so that the largest articles will not raise the brush roll above the position shown in Fig. 5, in which rods 28 are at the limit of their forward movement in bores 29.

Each section roll of each brush unit is bodily supported on the coupling rods 28 throughout the rotary drive of that roll on its own axis in its limiting low position. This is shown by the full and dotted line presentations in Fig. 6 of the eccentric bores 29 in the core of the brush section roll and of the coupling rods 28 therein as those bores take differing angular positions about the axis of the roll and those rods take correspondingly differing angular positions about the axis of the driving shaft 26 as the roll is driven from that shaft by the coupling rods in the rotation of the roll on its own axis in its limiting low position. In this connection, it is to be noted that the coupling rods 28 constantly engage the core body of the brush section roll within the eccentric bores 29 at points equally spaced apart about the axis of the core to rotate the roll under pressure against its lower run of articles of fruit on the conveyor, but the positions of these points of engagement change with respect to their radial distance from the axis of the roll as the roll moves upward and downward. For example, in the low position of a brush section roll, shown in Fig. 6, as well as in the high position shown in Fig. 5, the coupling rods 28 engage the core body of the roll within the eccentric bores 29 at points equally spaced apart about the axis of the roll. But, whereas a circle transcribed through these points of engagement is eccentric to the axis of the roll in the low position thereof shown in Fig. 6, it is concentric with that axis in the high position of the roll shown in Fig. 5. This is due, of course, to the fixed mounting of the coupling rods 28 on the driving shaft 26 of the brush unit which disposes those rods in a circular series concentric with that shaft, to the arrangement of the eccentric bores 29 in the core of each section roll in a circular series concentric with the axis of the roll and to the change in vertical position of the roll with respect to that shaft when the roll moves from its low to its high position.

It is further to be noted that in each brush unit the section rolls do not at any time engage the driving shaft 26. The driving shaft of each brush unit may, therefore, be formed as a divided or two-part shaft with the brush unit disposed between the parts so as to permit dispensing with the central bore 27 in the disc core 25' of each section roll and enable that core to be made solid except for the eccentric bores 29 through which the coupling rods 28 extend. Such a construction is advantageous where brush rolls of relatively small diameters are required or where the desired range of movement of the rolls radially of the driving shaft requires eccentric bores 29 in the cores of the rolls of substantially larger diameters relative to the diameters of the cores than indicated in the drawings for the present construction. On the other hand, where such requirements do not obtain, the present construction of the section rolls and their mounting in each brush unit is advantageous in avoiding the somewhat more complicated and heavier shaft mountings generally required to maintain the parts of a divided driving shaft in proper alignment. Either construction, however, presents rotary driving shaft means adjacent opposite ends of the brush unit, and the rod-and-socket coupling between that shaft means and the section rolls of the brush will be as already described.

The driving shafts 26 of the overhead brush units and the sprockets of the endless fruit conveyor may be driven from any suitable source of power and by any suitable transmission drive. Also, each of the overhead brush units may be driven, through its shaft 26, either in the direction of rotation of the conveyor rolls or in the opposite direction as may be found most advantageous in brushing the articles on the conveyor. In the machine unit shown in Figs. 1 to 3, inclusive, the power drive is first through the belt 32 to the pulley 33 on the sprocket shaft 34 of the conveyor adjacent one end of the machine unit and is transmitted therefrom through pulley 35 and crossed belt 36 to pulley 37 on shaft 26 of the brush unit at the adjacent or intake end of this machine unit, and the drive is transmitted from that shaft 26 to the shafts 26 of the next two brush units of the series by the sprocket and chain connection indicated at 38 and 39 in Fig. 1. The last brush unit of the series is driven from the sprocket shaft 34 of the conveyor by pulley 35' on that shaft and the straight belt 36' extending therefrom to pulley 37' on shaft 26 of that brush unit, as shown more particularly in Fig. 1. The entire driving arrangement is such as to drive all the brush rolls at a uniform and substantially higher peripheral speed than that of the conveyor and the conveyor rolls.

The length and stiffness of the brush bristles employed will vary with the character of the fruit to be treated, but where, as in the given example, the machine is designed more especially for the treatment of tender fruits, the section rolls of each brush unit of the series are provided with relatively long, soft and flexible bristles, such, for example, as bristles of fine horsehair having a length from the peripheral surface of the wooden core of the section roll more than half the diameter of that core, as shown more particularly in Figs. 2 and 3.

It is to be noted that, with the rack-and-pinion arrangement of the conveyor rolls and the driving connection between the conveyor drive and the shafts of the overhead sectional brushes described and shown for the machine unit of Figs. 1, 2 and 3, the conveyor rolls rotate individually and all in the same direction in those portions of the upper run of the conveyor extending beneath the brushes, and the section rolls of the first three brush units of the series of such units also have a single direction of rotation which is opposite to that of the conveyor rolls. The conveyor rolls therefore rotate each article of fruit F thereon in the direction of rotation of each section roll of these brush units; but as the fruit is engaged by the lower sides only of these brush rolls, the brush bristles sweep or drag over the upper surfaces of the articles of fruit in a direction opposite to the direction of movement of those surfaces due to the rotation of the articles. As stated above, the last brush unit of the series may be driven in the direction of rotation of the preceding brush units, but in order to avoid the tendency of the last brush unit, when thus driven, to impel the articles of fruit forwardly on the conveyor over the crowns of the conveyor rolls at the delivery end of the machine, provision is preferably made for driving that brush unit of the series in a direction of rotation opposite to that of the preceding brush units, as hereinbefore described and shown in the drawings. The sweeping or dragging movement of the relatively long, soft and flexible brush bristles of the rolls of each brush unit over the articles of fruit on the conveyor is a factor in giving the fruit a relatively light but very effective rubbing or brushing. Another factor contributing to such a rubbing or brushing action on the fruit is the character of the brushes as floating sectional overhead brush rolls and their relatively high peripheral speed.

With the machine idle or running without fruit therein, each section roll of each overhead brush unit will occupy, by its own weight, its lowermost position, shown for all the section rolls except the first three at the left in Fig. 2 and for the first and third section rolls in Fig. 3. Approximately that low position may still be occupied by any section roll during the running of the machine when an article of fruit of the minimum size which the machine is designed to effectively brush is advanced into engagement therewith, for generally the upward pressure of such an article of fruit against the section roll will be approximately equal to but not greater than the weight of that roll. But when a brush section roll is engaged by an article of fruit of sufficiently larger size in the lot being treated to overcome the weight of that roll, the latter will rise, within the permissible limit, until the upward pressure of the article of fruit against the brush surface becomes approximately equal to the weight of the engaged roll. The upper limit for effective operation of the section rolls of the present machine is the position of the two section rolls at the left in Fig. 2 and the second and fourth section rolls in Fig. 3. As hereinbefore pointed out, each brush section roll is movable upward by engagement therewith of advancing articles of fruit on the conveyor substantially without other opposition than that afforded by the weight of the engaged roll; and, of course, these section rolls are supported in all but their limiting low positions by the articles which move them upward.

Upon such upward movement of any section roll from its limiting low position of support on the coupling rods 28, those rods engage the core of the roll within the eccentric bores 29 at points which, although not providing a support for the roll on the rods, continue to provide a driving connection between the shaft 26 of the brush unit and the section roll in question, as shown for example in Fig. 5.

It is thus apparent that within the practical limits of the range of sizes of fruit which the overhead brushes may be designed to handle, the brush pressure on the fruit is determined substantially only by the weight of the engaged section rolls, and the friction applied is substantially the same regardless of the size of the fruit. These operating features of the section rolls, together with their relatively light weight and the relatively long, soft and flexible bristles with which they are provided, ensure that delicacy of rubbing or brushing action on the fruit required to avoid injury to the more tender varieties and without sacrifice in effectiveness of the rubbing or brushing action, for as thus constructed the brushes can safely be driven at a substantially higher speed than the fruit conveyor, as provided for by the driving connections shown more particularly in Fig. 1, so as to give a substantially greater speed to the brush surfaces in engagement with the fruit than that of the forward feed of the fruit by the conveyor and the rotational speed of the fruit thereon under the brushes.

In connection with the foregoing, it may be noted that while the arrangement of three coupling rods 28 for the driving connection between the section rolls and the driving shaft 26 of each overhead brush unit is not indispensable for the satisfactory operation of the brush and any convenient number, more than two, of coupling rods 28 may be used, it has been found that the arrangement shown of three such rods, with the corresponding eccentric bores 29 in the disc cores of the brush through which those rods extend, is particularly suitable as a well balanced arrangement. It may further be noted that the number of brush units employed in series longitudinally of the machine may be greater or less than the four shown in Fig. 3, the number generally depending upon the particular uses for which the machine is designed. Also, the length along the driving shaft 26 of each overhead brush as a whole or unit will, of course, depend upon the designed size and capacity of the machine, and the section rolls employed in each overhead brush unit may also vary in length along that shaft and in their number, above and below the twelve sections shown for each brush unit in Fig. 2. The general object in respect to the length of each brush unit along the driving shaft 26 transversely of the conveyor, the number of section rolls forming that unit and the length of each section roll is to provide overhead brushes of this character adapted to the size and capacity of the machine and to enable each brush unit, by way of its upwardly and downwardly movable section rolls, to accommodate itself to individual variations in sizes of fruit handled by the machine in the manner already described, and further to enable each brush unit to conform to the surface contour of the upper side of each individual fruit rotated on the conveyor in contact with the brush. The relatively short dimension of each section roll across its brush face, the length and flexibility of its bristles and the movability of each section roll upwardly and downwardly independent of the others, are important factors in this last mentioned operating feature of the conformation of the brush to the shape of the fruit, as illustrated by the engaging positions of a plurality of the section rolls of one of the overhead brush units with an article of fruit such as a pear, for example, diagrammatically represented at F in Fig. 2.

The machine unit described above and shown in Figs. 1 to 3 inclusive may be used to carry out a wide variety of fruit treatments requiring a rubbing or brushing of the fruit. It may be provided with means to apply an aqueous or other cleansing liquid to fruit on the conveyor or to one or more of the overhead sectional brushes so as to enable the use of this machine unit as a washer in which fruit is rubbed or brushed with the cleaning fluid. When the machine is to be so used, the disc cores of the overhead brush rolls may be provided with somewhat stiffer bristles, for example, tampico fiber bristles, or bristles of mixed tampico fiber and horsehair, of such length and fineness as to give them the required degree of softness and flexibility to avoid injury to fruit of the more tender varieties when the machine is designed to handle such fruit. Or this machine unit may be adapted for use as a drier for fruit which has been subjected to a water washing before being fed thereto, in which case the brush rolls will be provided with bristles of a suitable type, for example, such as to wipe moisture from the fruit while still retaining the characteristics of softness and flexibility of the brush material for the delicate handling of fruit required to avoid injury to the more tender varieties.

In the given example, however, the machine unit shown in Figs. 1 to 3 inclusive is designed more particularly for the treatment of fruit with a waxy material in a manner to form a thin film-like coating of that material over each individual fruit. To that end, means are provided for applying the waxy material, such as paraffin wax, for example, to fruit on the conveyor in the required amount so that the overhead brushes may function to spread the same uniformly thereover. In the present example, that means takes the form of a wax atomizing or nebulizing unit, indicated generally at 40 in Figs. 1, 2 and 3, discharging the paraffin or other waxy material in fluent condition through the lead pipe 41, header 42 and nozzles 43 upon the upper runs of the section rolls 25 of the first brush unit of the series adjacent the fruit-receiving end of this machine unit, as shown more particularly in Figs. 2 and 3. The atomizing or nebulizing unit 40 may be of any suitable type, such, for example, as that disclosed in the Skinner Patent No. 1,830,297 of November 3, 1931.

In this machine unit, the overhead brushes and the major portion of the length of the fruit conveyor, in the region of its path of travel through the brushing zones, are enclosed by a housing 44 mounted within the framework of the machine unit, this housing preferably having a hopper or pan-like bottom 45 with a removable closure cap 46 for the collection and removal from time to time of such surplus coating material as may find its way below the brushing mechanism and settle. This housing has openings 47 in its opposite end walls, each provided with a flexible flap closure 48, through which fruit may pass, on the upper run of the conveyor, into and from the housing. Fruit such as pears, for example, may be fed to the conveyor by any suitable means, such, for example, as the feed chute 49, at the fruit-receiving end of machine unit and may be delivered from the conveyor at the opposite end by any suitable means, such, for example, as the chute board 50, the fruit then rolling over that board to the elevator 51 of the conventional endless roller-belt type customarily employed in delivering fruit from a machine unit of this general character.

The housing or chamber 44 is provided with steam coils 52, or other suitable heating means, to warm the atmosphere around the overhead brushes and the conveyor with the fruit thereon to a sufficient degree above the melting point of the initial coating material to maintain it in fluent condition for the most effective application of that material to the fruit and the spreading of the same thereover.

In the operation of this machine unit, the section rolls of the first brush unit of the series, upon which the coating material is initially projected, function to transfer that material to the fruit engaging their lower runs and partially spread it over each individual fruit as the latter is not only bodily advanced beneath these brush rolls but also rotated against their lower runs by the rack and pinion drive of the conveyor rolls. Also, with the end spacing of the racks between each brush unit and the next as hereinbefore described and shown in Fig. 3, the rotation of the fruit on the conveyor ceases as the fruit leaves the region of the brushing action of one brush unit and does not begin again until the articles reach the region of the brushing action of the next brush unit of the series, so that each succeeding brush unit of the series takes up the brushing or rubbing of the surface of each article of fruit where the preceding brush unit left off. Some of the waxy material projected from nozzles 43 will generally also reach the second brush unit of the series. However, the last brush unit or the last two brush units of the series will be sufficiently free from deposits of the coating material and sufficiently dry to complete the spreading of that material into the desired uniformly thin film coating on each individual fruit.

The machine unit shown in Figs. 7 and 8 is a fruit polisher to which the wax-coated fruit from the coating machine unit is delivered for further brushing of the fruit to impart a high polish thereto. Although the given example of a fruit polisher employing the principles of the invention is that of a machine unit in series with the coating machine unit to complete the treatment of fruit begun by the last-mentioned unit, the field of usefulness of the polisher is not confined to such series use or to the polishing of wax-coated fruit but extends, among other uses, to the polishing of fruit whether wax-coated or not. However, the machine unit shown in Figs. 7 and 8 is particularly adapted for the polishing of wax-coated fruit because of the fact that such fruit generally requires a substantially more rapid movement of the polishing elements against it than is required for uncoated fruit in order to impart a high polish thereto, and the overhead floating sectional brushes employed in this polisher machine unit may be driven at high speed against the fruit without injury to even the more tender varieties.

The elevator 51, of the conventional endless roller belt type, which delivers the fruit from the coating machine unit shown in Figs. 1 to 3 inclusive, also forms the fruit conveyor of the polisher unit. The polisher unit further comprises a framework which includes the pair of oppositely disposed uprights 18 of the coating machine unit at the delivery end of the latter, additional pairs of uprights 53, and two pairs of longitudinal side rail members 54 and 55 secured to the uprights. The conveyor comprises an endless series of brushless rolls 56 disposed transversely of the conveyor, in parallel relation and slightly spaced apart, between the pair of endless side chains 57. Those chains are trained over two pairs of sprockets 58 and 59 having their shafts journaled in bearings 60 and 61 mounted on the lower side rails 54 of the framework of the machine adjacent its opposite ends, so as to dispose the upper or fruit-supporting and conveying run of the conveyor at a substantial upward inclination in the direction of its travel, indicated by the arrow, from the fruit-receiving to the discharge end of this machine unit. The same rack and pinion arrangement employed for rotating the rolls of the fruit-conveyor in the coating machine unit shown in Figs. 1 to 3 inclusive may be employed in the polisher unit so as to provide for the rotation of the conveyor rolls in their upper run only while under the overhead brushes. Preferably, however, in this polisher unit means are provided for continuously rotating the conveyor rolls throughout their upper run, which means may, conveniently, take the form of a pair of opposite-side tracks 62 disposed immediately beneath the upper run of the conveyor in position to be engaged by the conveyor rolls and impart rotative movement thereto as those rolls are carried along in the upper run of the conveyor, it being understood, of course, that the conveyor rolls are provided with journal pins at their opposite ends rotating in bearing blocks of the conveyor chains as shown in Fig. 9 for the fruit conveyor of the coating machine unit. It is immaterial whether the conveyor rolls partake of rotative movement in the lower run of the conveyor, but a like pair of lower side tracks 63 may be provided beneath the lower run of the conveyor for engagement of the rolls therewith simply as a convenient means of supporting the conveyor at points in its lower run intermediate the sprockets of the conveyor chains.

A plurality of overhead floating sectional brushes, 64, in this instance three in number, are employed in the polisher unit. Each brush as a whole or unit comprises a plurality of brush section rolls, 65, having a disc core 66 of wood or other suitable light-weight material and brush bristles 67 of horsehair or other relatively soft and flexible material extending therefrom. A driving shaft 68 extends through a central bore 69 and three coupling rods 70 extend through eccentric bores 71 radially spaced from the central bore and circumferentially from each other in each disc core, and those rods are connected through flanges 71' to the driving shaft 68 as shown in Figs. 7 and 8, all of these parts being as shown and described for the like features of the overhead brushes employed in the coating machine unit. Preferably, however, for more effective polishing action on fruit, the section rolls of the overhead brushes of this polishing machine unit are provided with somewhat shorter and therefore somewhat less flexible bristles than those employed in the coating machine unit.

As in the case of the coating machine unit, any suitable driving means may be employed for the fruit conveyor and for the overhead floating sectional brushes of the polisher unit. In the example given, the driving means for the fruit conveyor comprises a pulley 72 on the sprocket shaft 73 of the conveyor and a belt 74 which drives that pulley from any suitable source of power. The overhead brushes are driven from the sprocket shaft 73. The drive is transmitted through pulley 75 on shaft 73 and the crossed belt 76 to the pulley 77 on the driving shaft 68 of the first brush unit of the series and from that shaft to the shafts 68 of the other brush units through the sprocket and chain drive 78 similar to the sprocket and chain drive shown in Fig. 1 for the coating machine unit. The driving connections, through the crossed belt 76, are such as to drive the brush rolls of this polisher unit in a direction of rotation opposite to that of the conveyor rolls so as to cause the lower runs of the brush rolls to engage the uppermost surface portions of the fruit in a direction of movement opposite to that imparted to those surfaces of the fruit by the conveyor rolls, as in the case of the first three brush units of the series of such units in the coating machine. In the polisher unit, however, the elements of the driving means shown for the fruit conveyor and the driving connections therefrom to the overhead brush rolls are preferably so proportioned and arranged as to drive the overhead brush rolls at a substantially higher speed, in relation to the speed of the fruit conveyor, than the brush rolls are driven in the coating machine unit. The higher speed of the polisher brushes substantially enhances their polishing effect on the wax-coated fruit, and especially so when the fruit is advanced in an upwardly inclined path against the brushes which somewhat increases the friction of the brushes on the fruit.

The upper side rails 55 of the polisher unit extend along the series of conveyor rolls in the upper run of the conveyor to function as guide rails preventing the fruit from moving endwise off the conveying rolls, and these rails 55 are extended at a downward inclination, at the fruit-delivery end of the machine, to guide the fruit from the delivery end of the conveyor onto the chute board 79 over which the fruit rolls to suitable conveyor means, indicated at 80, for conveying the fruit away for subsequent grading, sizing and packing for shipment.

What is claimed is:

1. An article brushing machine comprising the combination, with a conveyor for supporting and advancing articles to be brushed in a predetermined path, of brushing means mounted over said conveyor and comprising a rotary driving shaft maintained at a predetermined level above said path, a rotary brush roll and means comprising a plurality of rigid coupling elements extending from and revolving with said shaft and each engaging said roll to mount the same for movement thereof from a limiting low position upward to varying extents radially of said shaft by upward pressure, against the lower side of said roll, of articles of correspondingly varying vertical dimensions on said conveyor substantially without other opposition than that afforded by the weight of said roll, said mounting means also operating to drive said brush roll from said shaft in rotary movement only of said roll on its own axis in all vertical positions of said roll.

2. An article brushing machine as defined in claim 1 and in which said rigid coupling elements are equally spaced from each other circumferentially of said shaft, and said brush roll is provided with a rigid core formed for driving engagement of said rigid elements therewith at a plurality of points of like spacing about the axis of said roll.

3. An article brushing machine comprising the combination, with a conveyor for supporting and advancing articles to be brushed in a predetermined path, of brushing means mounted over said conveyor and comprising a rotary brush roll disposed in substantially horizontal position transversely of said path, a rotatable driving shaft for said brush roll having a mounting maintaining said shaft in substantially horizontal position at a predetermined distance above said conveyor, means for driving said shaft, and means comprising a plurality of rigid elements extending from and revolving with said shaft and each engaging said brush roll to mount the same for downward movement thereof radially of said shaft by gravity alone from a limiting high position of said roll concentric with said shaft to a limiting low position thereof eccentric to said shaft and for upward movement of said roll radially of said shaft to varying extends within said upper limit by upward pressure, against its lower side, of articles of varying vertical dimensions on said conveyor, said mounting means also operating to transmit rotary movement to said roll from said shaft in all vertical positions of said roll.

4. An article brushing machine as defined in claim 3 and in which said brush roll has a solid core provided with apertures spaced apart about the axis of said roll and said rigid elements of said brush-mounting means are spaced apart circumferentially of said shaft and extend into engagement with said core within said apertures to drive said brush roll from said shaft, mount said roll for said upward movement thereof radially of said shaft by pressure, against its lower side, of articles on said conveyor and restrain said roll from any substantial movement radially of said shaft by centrifugal force developed in the driving of said roll from said shaft.

5. In an article brushing machine, the combination with a conveyor for supporting and advancing articles to be brushed in a predetermined path, of a rotary brush roll disposed in substantially horizontal position transversely of said path and having a solid core, rotary shaft means on opposite sides of said brush roll and mounting means therefor maintaining said shaft means at a predetermined vertical distance above said conveyor, a pair of flanges carried by said shaft means with said flanges disposed on opposite sides of said brush roll, and a rod-and-socket coupling between said flanges and the core of said brush roll mounting said roll for upward movement thereof radially of said shaft means from a limiting low position of said roll by upward pressure of articles on said conveyor, against the lower side, of said roll and also operating to rotate said roll on its own axis in unison with the rotation of said shaft means in all vertical positions of said roll.

6. A machine for brushing fruit and other articles of generally globular shape comprising the combination, with a conveyor for supporting and advancing such articles in a predetermined path, of overhead brush means comprising a rotary driving shaft disposed in substantially horizontal position transversely of said path at a predetermined vertical distance above said conveyor, a rotary brush formed of a plurality of separate sections with each of said sections constituting a complete brush roll and with said section rolls arranged in succession lengthwise thereof to form the brush as a whole or unit, and means comprising a plurality of rigid elements extending from and revolving with said shaft and engaging each of said section rolls at a plurality of circumferentially spaced points to mount the same for varying extents of upward movement radially of said shaft of each said section roll independently of the others from a limiting low position thereof by upward pressure, against its lower side, of articles of varying vertical dimensions on said conveyor substantially without other opposition than that afforded by the weight of said section roll, said mounting means also operating to simultaneously drive all said section rolls from said shaft in rotation of said section rolls each on its own axis in all vertical positions attained by said section rolls under engagement of said articles therewith.

7. A machine as defined in claim 6 and in which said conveyor is provided with means for rotating the articles thereon at a predetermined and substantially constant rate and said shaft is provided with driving means rotating said section rolls of said overhead brush at a rate imparting a higher peripheral speed thereto than that imparted to said articles by said conveyor.

8. A machine as defined in claim 6 and in which said conveyor is provided with brushless article-supporting surfaces.

9. In a machine for treating fruit, the combination with a conveyor for supporting and advancing fruit in a predetermined path, of overhead brush means comprising a rotary brush roll disposed in substantially horizontal position transversely of said path, a rotary driving shaft for said brush roll disposed in substantially horizontal position at a predetermined vertical distance above said conveyor, means forming a rigid driving connection from said shaft to said brush roll and a mounting for the latter rendering said roll movable radially of said shaft from a limiting low position of said roll upward to varying extents by upward pressure, against its lower side, of articles of fruit of varying sizes on said conveyor substantially without other opposition than that afforded by the weight of said roll, and means supplying fluent treating material to said brush roll for the brushing of the fruit with said material.

10. In a machine for treating fruit of generally globular shape, the combination with a conveyor for supporting and advancing such fruit in a predetermined path, of overhead brush means comprising a rotary driving shaft disposed in substantially horizontal position at a predetermined distance above said conveyor and transversely of said path, a brush unit formed of a plurality of separate sections disposed in end-to-end relation with each constituting a complete brush roll having a narrow brush face as compared with its diameter, means forming a driving connection from said shaft to said section rolls for rotation of said section rolls and a mounting for the latter rendering each section roll movable independently of the others radially of said shaft from a limiting low position thereof upward to varying extents by upward pressure, against its lower side, of fruit of varying sizes on said conveyor substantially without other opposition than that afforded by the weight of said section roll, and means supplying fluent treating material to each said section roll for the brushing of said fruit therewith.

11. In a machine for treating fruit, the combination with a conveyor having non-resilient surface elements for supporting and advancing fruit in a predetermined path, of overhead brush means comprising a brush roll disposed in substantially horizontal position transversely of said path, a rotary driving shaft for said brush roll having a mounting maintaining said shaft at a predetermined vertical distance above said conveyor, and means forming a driving connection from said shaft to said brush roll and a mounting for the latter rendering said roll movable radially of said shaft from a limiting low position of said roll upward to varying extents by upward pressure, against its lower side, of fruit of varying sizes on said conveyor substantially without other opposition than that afforded by the weight of said roll, said roll having brush elements of such length and pliability as to individually flex over curved surface portions of the fruit exposed to said brush roll and effect sliding or dragging contacts of said brush elements with said portions of the fruit.

12. A machine for brushing fruit and other articles of generally globular shape comprising the combination, with a conveyor of the endless roller-belt type having rolls disposed in substantially horizontal position transversely of the line of travel of the conveyor and in spaced and parallel relation, and means for driving said conveyor and for rotating said rolls individually all in the same direction, of brush means mounted over said conveyor and comprising an overhead brush unit extending in parallelism with said conveyor rolls, said unit being formed of a plurality of separate sections in end-to-end relation with each constituting a complete brush roll, a rotary driving shaft for said brush unit disposed in parallelism with said conveyor rolls at a predetermined vertical distance above said conveyor, and means comprising rigid elements extending from and revolving with said shaft and engaging each of said section rolls at a plurality of circumferentially spaced points to mount the same for movement of each said section roll independently of the others by gravity alone from a limiting high position of each said section roll concentric with said shaft downward radially of said shaft to a limiting low position thereof eccentric to said shaft and for upward movement of each said section roll independently of the others radially of said shaft to varying extents within said upper limit by upward pressure, against its lower side, of articles of varying vertical dimensions on said conveyor, said mounting means also operating to transmit rotary movement to said section rolls from said shaft in all vertical positions of said rolls.

13. An article brushing machine as defined in claim 12 and further characterized by means for driving said shaft at a rotation rate giving said section rolls of said brush a higher peripheral speed than that of said conveyor and said conveyor rolls.

14. An article brushing machine as defined in claim 12 and further characterized by means for driving said shaft and thereby said section rolls of said brush in a direction of rotation opposite to that of said conveyor rolls and at a rotation rate giving said section rolls of said brush a higher peripheral speed than that of said conveyor and said conveyor rolls.

15. A machine for treating fruit comprising the combination, with conveyor means for supporting and advancing fruit in a predetermined path, means for feeding fruit to said conveyor means and means for applying spreadable coating material to said fruit, of means for spreading said coating material over said fruit on said conveyor, said spreading means comprising a plurality of overhead brush units spaced apart to form a series of said units extending in the line of advance of said fruit from said applying means and with each such brush unit extending transversely of the path of travel of said fruit and formed of a plurality of sections in end-to-end relation with each section constituting a complete brush roll having a narrow brush face as compared with its diameter, a rotary driving shaft for each of said brush units having a mounting maintaining said shaft in horizontal position at a predetermined vertical distance above said conveyor, and means forming a driving connection from each said shaft to the section rolls of the corresponding brush unit and a mounting for said section rolls rendering each of them movable independently of the others from a limiting low position thereof to varying extents radially upward of said shaft by upward pressure, against its lower side, of articles of fruit of varying vertical dimensions on said conveyor substantially without other opposition than that afforded by the weight of said section roll.

16. A fruit-treating machine as defined in claim 15 and in which said conveyor means is provided with means for rotating each individual fruit on said conveyor means while in contact with said overhead brush rolls and for maintaining said fruit without rotation as it is advanced from one brush unit to the next of said series of brush units.

17. In a machine for treating fruit, the combination with means mechanically operating to apply waxy material to fruit fed to said machine and to spread the same in a film coating over said fruit, of means for polishing said wax-coated fruit comprising a conveyor automatically operating to advance said fruit in a predetermined path from the zone of action of said wax-applying and spreading means, and brushing means disposed over said conveyor, said brushing means comprising a brush roll extending transversely of the line of advance of said fruit, a rotary driving shaft for said brush roll having a mounting maintaining said shaft in horizontal position at a predetermined vertical distance above said conveyor and means forming a driving connection from said shaft to said brush roll and a mounting for the latter rendering said brush roll movable radially of said shaft from a limiting low position thereof upward to varying extents by upward pressure, against its lower side, of articles of fruit of varying vertical dimensions on said conveyor substantially without other opposition than that afforded by the weight of said brush roll.

18. In a fruit brushing machine, in combination, means for advancing fruit from the introductory end toward the discharge end of the machine along a predetermined path, a brush roll located above the fruit path, and means for rotatably driving the brush roll including a plurality of rigid coupling elements each engaging said roll, the brush roll being mounted to yield upwardly relative to the drive means and the fruit advancing means in response to upward pressure of the fruit.

19. In a fruit brushing machine, in combination, means for advancing fruit in a succession of parallel rows through the machine, and a plurality of overhead brush roll units for acting upon the fruit, a row at a time, each such unit comprising a series of independently yieldable section rolls, and common driving means for rotatably driving all the section rolls of the unit.

20. A fruit brushing machine comprising in combination means for advancing fruit in a succession of parallel rows through the machine, and an overhead brush roll unit for acting upon the fruit, a row at a time, such unit comprising a series of section rolls independently yieldable upwardly in response to upward pressure of the fruit, and common driving means for rotatably driving all the section rolls of the unit, including a plurality of rigid elements engaging each of the section rolls at a plurality of circumferentially spaced points.

21. A fruit brushing machine comprising in combination means for advancing fruit in a succession of parallel rows through the machine, and an overhead brush roll unit for acting upon the fruit, a row at a time, such unit comprising a series of section rolls independently yieldable upwardly in response to upward pressure of the fruit not greater than the weight of the section roll, and common driving means for rotatably driving all the section rolls of the unit, including a plurality of rigid elements engaging each of the section rolls at a plurality of circumferentially spaced points.

22. A fruit brushing machine comprising in combination means for advancing fruit in a succession of parallel rows through the machine, and an overhead brush roll unit for acting upon the fruit, a row at a time, such unit comprising a series of section rolls independently yieldable upwardly in response to upward pressure of the fruit not greater than the weight of the section roll, said section rolls being relatively thin axially and arranged contiguously to form a substantially continuous brushing surface, positioned relative to the advancing means for simultaneous brushing engagement of an individual fruit by a plurality of section rolls, and common driving means for rotatably driving all the section rolls of the unit including a plurality of rigid elements engaging each of the section rolls at a plurality of circumferentially spaced points.

RONALD R. BROGDEN.